United States Patent [19]

Maeda et al.

[11] Patent Number: 5,712,560
[45] Date of Patent: Jan. 27, 1998

[54] DRIVE SPEED DETECTOR FOR A MOTOR THAT DRIVES A DATA REPRODUCING DEVICE

[75] Inventors: Satoru Maeda; Hiroshi Nakane, both of Saitama-ken, Japan

[73] Assignee: Kabushiki Kaisha Toshiba, Kawasaki, Japan

[21] Appl. No.: 522,107

[22] Filed: Aug. 31, 1995

[30] Foreign Application Priority Data

Sep. 1, 1994 [JP] Japan ................................. 6-208721

[51] Int. Cl.⁶ ........................................... G01P 3/48
[52] U.S. Cl. .................. 324/174; 324/166; 324/207.2
[58] Field of Search ........................ 324/160–163, 324/166, 173, 174, 175, 207.2–207.25, 202, 207.12, 207.11, 234, 236, 239, 201

[56] References Cited

U.S. PATENT DOCUMENTS

| | | | |
|---|---|---|---|
| 4,293,814 | 10/1981 | Boyer | 324/166 |
| 4,305,072 | 12/1981 | Makita | 324/174 |
| 4,966,041 | 10/1990 | Miyazaki | 324/207.2 |
| 5,012,207 | 4/1991 | Edwards | 324/166 |
| 5,532,583 | 7/1996 | Davis et al. | 324/207.2 |

*Primary Examiner*—Sandra L. O'Shea
*Assistant Examiner*—Jay M. Patidar
*Attorney, Agent, or Firm*—Cushman, Darby & Cushman IP Group of Pillsbury, Madison & Sutro LLP

[57] ABSTRACT

A drive speed detector for a pickup feed motor including a detector for detecting the drive speed of the optical pickup feed motor by generating an AC signal with a frequency which is proportional to the drive speed of the optical pickup feed motor and a controller for controlling the sensitivity of the detecting means in order to uniform an amplitude level of the AC signal output from the detecting means.

5 Claims, 8 Drawing Sheets

DRIVE SPEED DETECTOR FOR A MOTOR THAT DRIVES A DATA REPRODUCING DEVICE

BACKGROUND OF THE INVENTION

1. Field of the Invention

The present invention relates to a disc reproducing system, such as a CD-ROM (Compact Disc Read Only Memory) drive, and more particularly, to an improvement of a drive speed detector of a pickup feed motor to move an optical pickup in the radial direction of the disc.

2. Background of the Invention

As is well known in the art, an optical disc reproducing system employs a high speed track search feature for rapidly searching for desired date out of an enormous amount of data recorded in the disc and reproducing the desired data. The high speed track search feature, i.e., so-called track jump operation, is realized by driving the optical pickup across the tracks in the radial direction of the disc to a target track where the object data is recorded.

A CD-ROM has a data recording area with about a 35 mm width in the radial direction. On the other hand, an object lens provided in the optical pickup has a maximum movable distance of about +0.5 mm in the radial direction of the disc. Accordingly, when the object lens is required to move a distance exceeding +0.5 mm in a fast track search operation, it will be necessary to move the optical pickup in the radial direction of the disc.

The optical pickup as mentioned above, which is movably held along a rail extending in the radial direction of the disc on a chassis of the disc reproducing system, is moved by transmitting driving power of an optical pickup feed motor via a prescribed gear system. In this case, the moving direction and moving speed of the optical pickup can be controlled by changing the rotating direction and the rotational speed of the optical pickup feed motor.

When the optical pickup is driven to move at a high speed in the radial direction of the disc by the optical pickup feed motor, it is necessary to always keep track of the moving speed to locate the optical pickup exactly on a desired position on the disc. One system for keeping track of the moving speed of the optical pickup is to detect the rotational speed of the optical pickup feed motor.

Figure 6:
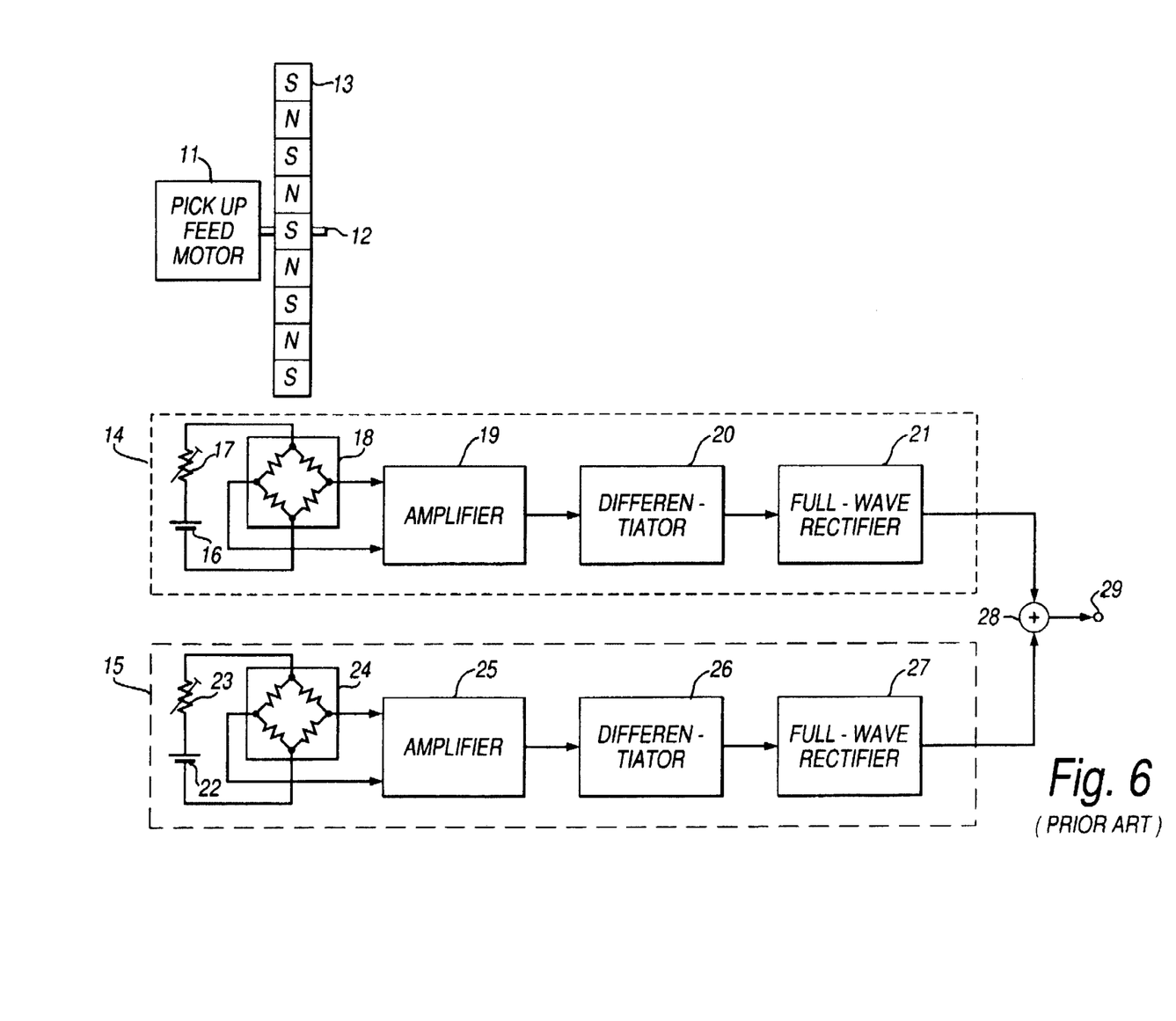
FIG. 6 is a block diagram showing a rotational speed detecting means according to the conventional optical pickup feed motor.

FIG. 6 shows a conventional detecting means for detecting the rotational speed of the optical pickup feed motor. In the drawing, a numeral 11 denotes an optical pickup feed motor. By controlling the rotating direction and rotational speed of the optical feed motor, the rotating direction and rotational speed of an optical pickup (not shown) is controlled. A disc-shape magnetic rotary member 13 is coaxially fit to a rotor 12 of the optical pickup feed motor 11 so as that they rotate together.

The peripheral edge of the magnetic rotating member 13 is magnetized at regular pitches with alternative opposite magnetic poles, i.e., S and N-poles. Near the peripheral edge of the magnetic rotating member 13, two magnetic-flux density sensing circuits 14 and 15 are installed. The magnetic-flux density sensing circuit 14 includes a Hall effect device 18 located near the peripheral edge of the magnetic rotating member 13, to which a DC bias current is supplied by a DC voltage source 16 and a variable resistor 17.

Accordingly, an AC signal with a frequency which is proportional to the rotational speed of the optical pickup feed motor 11 is output from the Hall effect device 18 based f on the magnetic-flux density change which occurs around the magnetic rotating member 13 rotating with the rotor 12. Further, the AC signal output from the Hall effect device 18 is amplified to a desired amplitude level by an amplifier 19, and converted to an AC signal with the amplitude level which is proportional to the rotation speed of the optical pickup feed motor 11 by a differentiator 20, then full-wave rectified in the full-wave rectifier 21 so as to be converted to a pulsating signal with an amplitude level which is proportional to the rotational speed of the optical pickup feed motor 11.

On the other hand, the magnetic-flux density sensing circuit 15 includes a Hall effect device 24 to which a DC bias current is supplied by a DC voltage supply 22 and a variable resistor 23 near the magnetic rotating member 13. Accordingly, an AC signal with a frequency which is proportional to the rotational speed of the optical pickup feed motor 11 is output from the Hall effect device 24 based on the magnetic-flux density change which occurs around the magnetic rotating member 13 rotating with the rotor 12. Here, the Hall effect devices 18 and 24 in the magnetic-flux density sensing circuits 14 and 15 are positioned such that they develop AC signals with 90 degrees of phase difference therebetween.

Further, the AC signal output from the Hall effect device 24 is amplified to a desirable amplitude level by an amplifier 25, and its amplitude is adjusted to a level proportional to the rotation speed of the optical pickup feed motor 11 by a differentiator 26, then operated upon by full-wave rectifier 27 so as to be converted into a pulse signal with an amplitude level which is proportional to the rotational speed of the optical pickup feed motor 11.

As described above, the pulse signals output from the magnetic-flux density sensing circuits 14 and 15 are added to each other by being supplied to an adder 28 so as to yield an almost DC rotational speed detecting signal with an amplitude level in proportion to the rotational speed of the optical pickup feed motor 11. Then the rotational speed detecting signal is output from an output terminal 29.

The rotational speed detecting means as described above causes a loss of a detected signal which is obtained from the output signal 29, because of variations of the detecting sensitivity between the Hall effect devices 18 and 24, and the magnetic-flux density of the magnetic rotating member 13. In addition, a space distance between the Hall effect devices 18, 24 and the magnetic rotating member 13 causes variations in the detecting sensitivities of the rotational speeds of the optical pickup feed motors by the magnetic-flux density sensing circuits 14 and 15.

Therefore, the conventional drive speed detector of pickup feed motor has kept a high degree of reliability in the detecting signal by adjusting the variable resistors 17 and 23 to adjust the detecting sensitivity of the Hall effect devices 18 and 24, and absorbing variations in physical characteristics of the parts. However, the conventional adjusting means has a drawback in that it is unsuitable to a practical use since individual adjustments, which are troublesome and difficult to make during manufacturing, are required for each of the disc reproducing systems.

As described above, the conventional drive speed detector of pickup feed motor has a drawback in that it is unsuitable to the practice use since the adjusting operation to absorb variations in physical characteristics of parts must be individually carried out but they are troublesome and difficult to manufacture.

SUMMARY OF THE INVENTION

Accordingly, the present invention is intended to solve the above problems. Thus, it is an object of the present invention to provide an extremely advantageous drive speed detector of optical pickup feed motor, which is capable of keeping a high degree of reliability in the detecting result without adjusting operations for absorbing variations in physical characteristics of parts.

In order to achieve the above object, a drive speed detector of pickup feed motor according to one aspect of the present invention includes a detector for detecting the drive speed of the optical pickup feed motor by generating an AC signal with a frequency which is proportional to the drive speed of the optical pickup feed motor and a controller for controlling the sensitivity of the detecting means in order to make uniform an amplitude level of the AC signal output from the detecting means.

In a drive speed detector of optical pickup feed motor according to another aspect of the present invention, the controlling means controls in a feedback manner the sensitivity of the detecting means in order to match the amplitude level of the AC signal output from the detecting means with a prescribed reference level by comparing these two levels so as that their level difference is eliminated.

In a drive speed detector of optical pickup feed motor according to still another aspect of the present invention, i the detecting means includes a first detecting portion for detecting the drive speed of the optical pickup feed motor by generating a first AC signal with a frequency which is proportional to the drive speed of the pickup feed motor and a second detecting portion for detecting the drive speed of the optical pickup feed motor by generating a second AC signal which has a 90 degree phase difference with the first AC signal output from the first detecting portion, and the controlling means controls in a feedback manner the, sensitivity of the detecting means in order to match a level of a third AC signal generated by adding the first AC signal and the second AC signal with a prescribed reference level by comparing these two levels so as that their level difference is eliminated.

In a drive speed detector of optical pickup feed motor according to still another aspect of the present invention, the detecting means comprises a magnetic rotating member which is rotatable in conjunction with the pickup feed motor and alternatively magnetized at regular pitches with opposite magnetic poles on its round peripheral edge, a first Hall effect device mounted near the magnetic rotating member for generating a first AC signal with a frequency which is proportional to the drive speed of the pickup feed motor based on the magnetic-flux density change responding to the rotation of the magnetic rotating member, and a second Hall effect device also mounted near the magnetic rotating member for generating a second AC signal with a frequency which is proportional to the drive speed of the pickup feed motor at a 90 degree phase difference with the first AC signal output from the first Hall effect device based on the magnetic-flux density change responding to the rotation of the magnetic rotating member, and wherein the controlling means comprises first and second rectifiers for respectively carrying out full-wave rectifications of the first and second AC signals output from the first and second Hall effect devices, an adder for adding the first and second AC levels output from the first and second rectifiers with each other, and means for controlling in a feedback manner a DC bias current to be supplied to the first and second Hall effect devices in order to match a level of the DC signal output from the adder with a prescribed reference level by comparing these two levels so as that their level difference is eliminated.

In the construction described above, the present invention detects the drive speed of the optical pickup feed motor by generating an AC signal with a frequency which is proportional to the drive speed of the optical pickup feed motor and controls the sensitivity of the detecting means in order to uniform an amplitude level of the AC signal output from the detecting means, so as to keep a high degree of reliability on the detecting result without an adjusting operation for absorbing variations in physical characteristics of parts.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
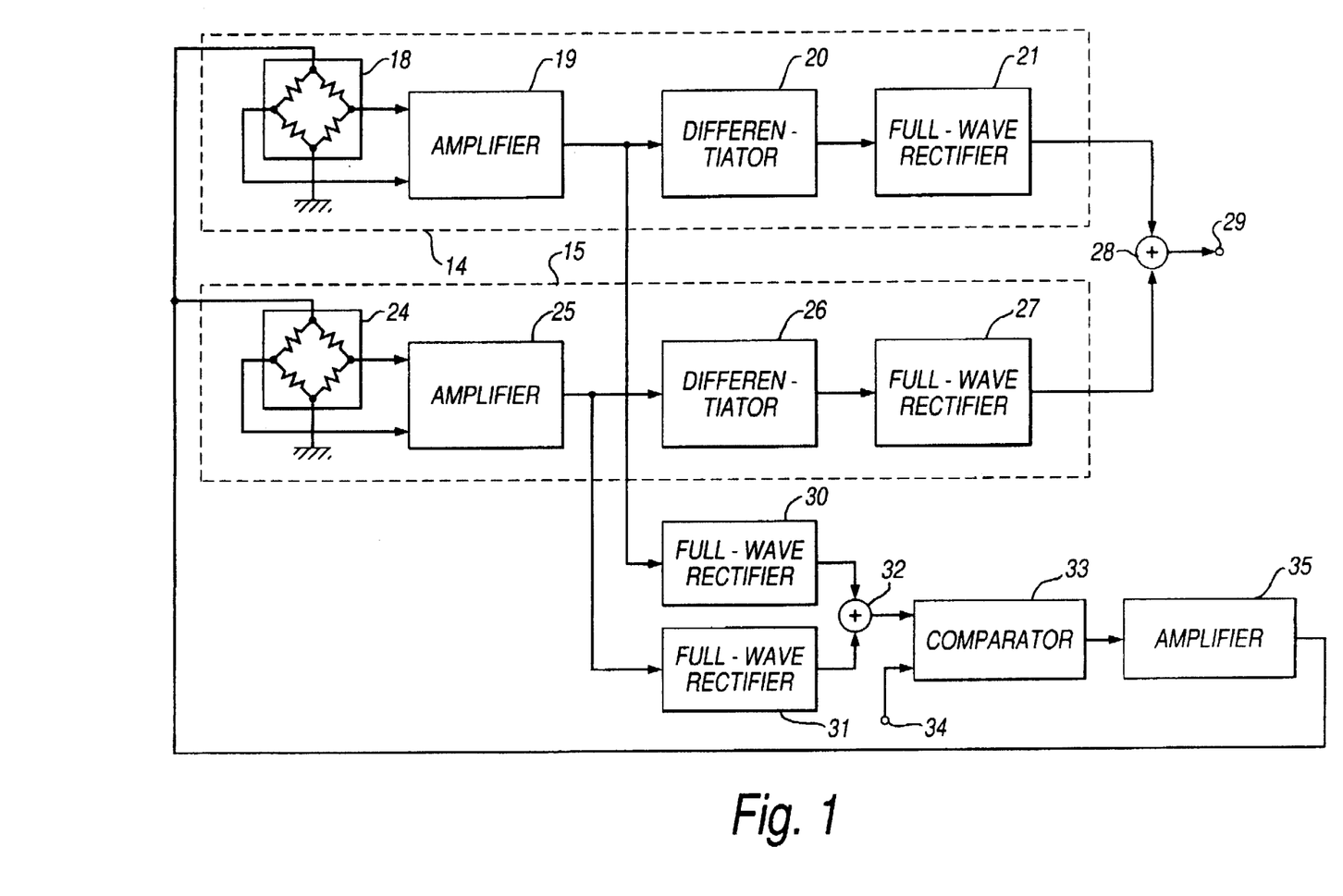
FIG. 1 is a block diagram showing one embodiment of the optical pickup feed motor drive speed detector according to the present invention.

Examplary embodiments of the present invention will be explained hereinafter in reference to the FIGS. 1 through 5. In FIG. 1 the same components as those shown in FIG. 6 are assigned with the same numerals. The optical pickup feed motor 11, rotor 12 and magnetic rotating member 13, as shown in FIG. 6, are omitted from FIG. 1 for the simplicity of explanations. In FIG. 1, AC signals output from amplifiers 19 and 25 of the magnetic-flux density sensing circuits 14 and 15 are supplied to full-wave rectifiers 30 and 31 for converting the AC signals to DC voltage levels. Then, the DC voltage levels are added to each other in an adder 32.

The combined DC voltage level output from the adder 32 is supplied to a comparator 33 to compare its level with a reference DC level, which is applied through an input terminal 34. The comparator 33 thus outputs an AC voltage level which corresponds to the level difference between the AC voltage level output from the adder 32 and the reference AC level on the input terminal 34. The AC voltage level is amplified to a specific voltage level in an amplifier 35, and then applied to the Hall effect devices 18 and 24 as an AC bias voltage, respectively.

In this case, the comparator 33 controls, in a feedback manner, the AC bias voltage applied to the Hall effect devices 18 and 24 to match the DC voltage level output from the adder 32 to the level of the DC reference applied from the input terminal 34. Thus, the detecting sensitivities of the Hall effect devices 18 and 24 are automatically adjusted so as to match the two inputs of the comparator 33 with each other, through a feedback loop composed of the amplifiers 19, 25, the full-wave rectifiers 30, 31, the adder 32, the comparator 33 and the amplifier 34 to the Hall effect devices 18, 24.

Accordingly, the present invention can prevent both of the AC signal levels input to the differentiators 20 and 26 from varying by absorbing variations in the detecting sensitivities of the Hall effect devices 18 and 24, the magnetic-flux densities of the magnetic rotating member 13 or the distances between the Hall effect devices 18, 24 and the magnetic rotating member 13, so as to keep a high degree of reliability in the detecting signal which is obtained from the output terminal 29.

Figure 2:
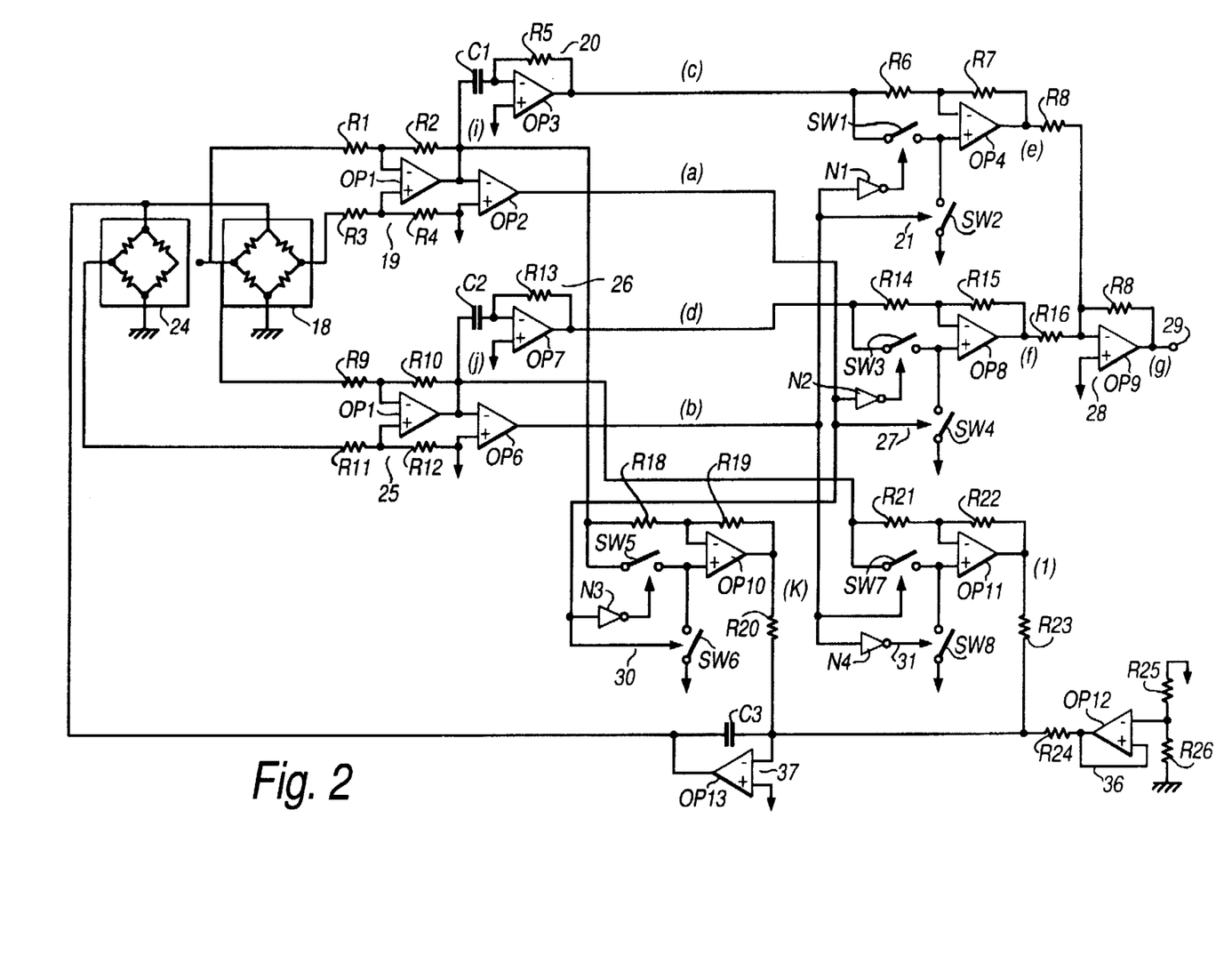
FIG. 2 is a circuit diagram showing a detail construction of each blocks of same embodiment.

Next, FIG. 2 shows the detail construction of respective circuit blocks shown in FIG. 1. First, an AC signal output from the Hall effect device 18 is supplied to the amplifier 19, which is composed of resistors R1 to R4 and operational amplifiers OP1 and OP2, the differentiator 20, which is composed of a capacitor C1, a resistor R5 and an operational amplifier OP3, and the full-wave rectifier 21, which is composed of switches SW1 and SW2, a NOT circuit N1, resistors R6 to R8 and an operational amplifier OP4, in that order.

An AC signal output from the Hall effect device 24 is supplied to the amplifier 25, which is composed of resistors R9 to R12 and operational amplifiers OP5 and OP6, the differentiator 26, which is composed of a capacitor C2, a resistor R13 and an operational amplifier OP7, and the full-wave rectifier 27, which is composed of switches SW3 and SW4, a NOT circuit N2, resistors R14 to R16 and an operational amplifier OP8, in that order. Then, the pulse signals output from the full-wave detectors 21 and 27 are added with each other in the adder 28 which is composed of a resistor R17 and an operational amplifier OP9, and then output through the output terminal 29.

Further, an AC signal output from an amplifier 19 is supplied to a full-wave rectifier 30 composed of switches SW5 and SW6, a NOT circuit N3, resistors from Rz18 to R20 and an operational amplifier OP 10. An AC signal output from an amplifier 25 is supplied to full-wave rectifier 31 composed of switches SW7 and SW8, a NOT circuit N4, resistors R21 to R23 and an operational amplifier OP11.

The DC voltage levels output from the full-wave rectifiers 30 and 31 are summed together as they are, and then the combined DC voltage level is compared with the reference DC level output from a reference level generator 36, which is composed of resisters from R24 to R26 and an operational amplifier OP12, in a referencing amplifier 37, which is composed of a capacitor C3 and an operational amplifier OP37 The compared output is applied to the Hall effect devices 18 and 24 as the DC bias current.

Figure 3A:
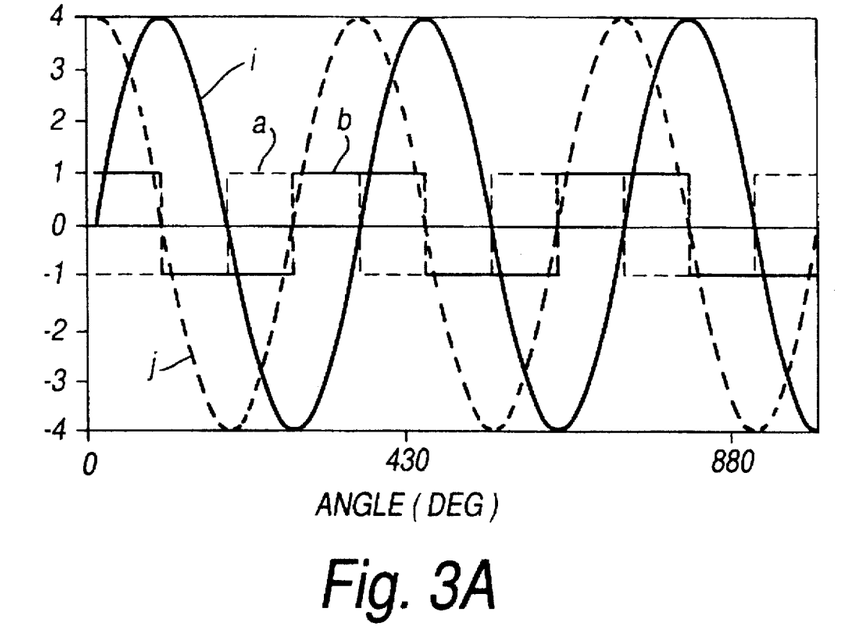
FIGS. 3A–3C are diagrams showing a signal waveform of each portion of a same embodiment.
Figure 3B:
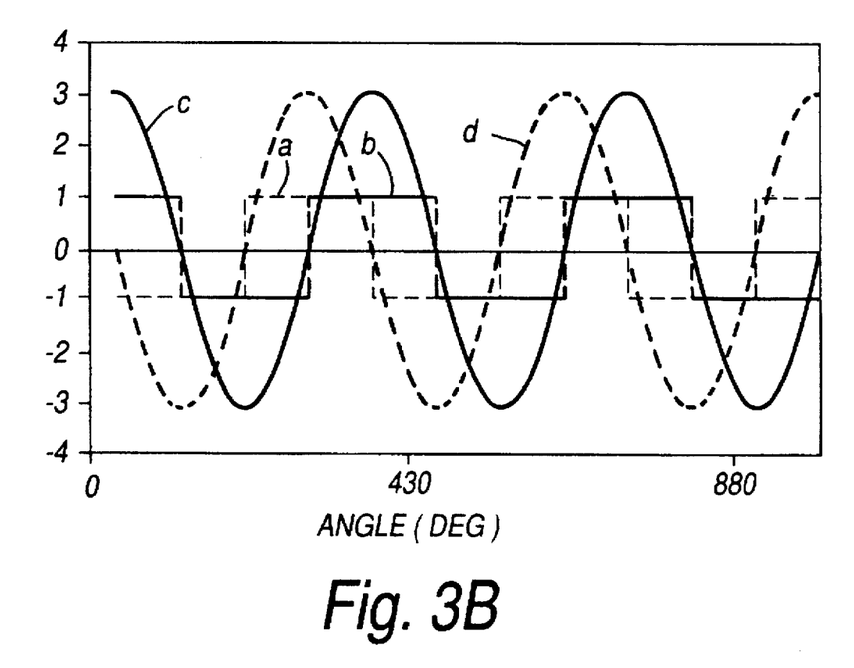
Figure 3C:
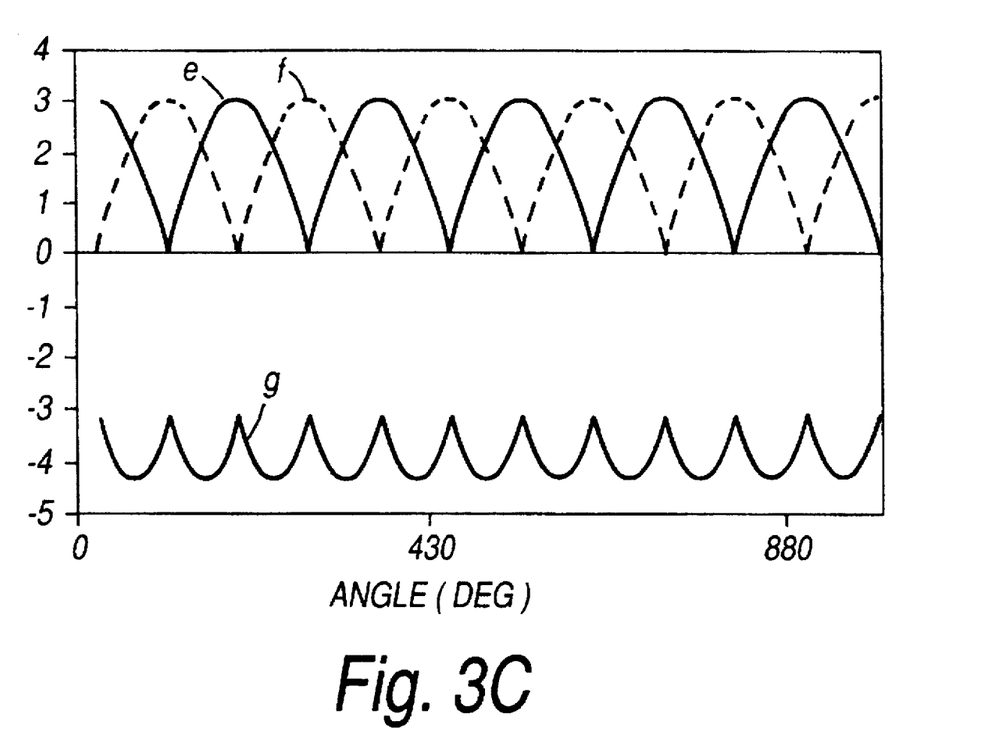

When the optical pickup moves in the radial direction of the disc at a prescribed speed, i.e., when the optical pickup feed motor 11 is rotatably driven at a prescribed rotational speed, the signals on portions (a), (b), (i) and (j) in FIG. 2, correspond to curves a, b, i and j as shown in FIG. 3(a). Then the signals on portions (a), (b), (c) and (d) in FIG. 2, correspond to curves a, b, c and d, as shown in FIG. 3(b). Further the signals on portions (e), (f) and (g) in FIG. 2 correspond to curves e, f and g, as shown in FIG. 3(c).

Figure 4A:
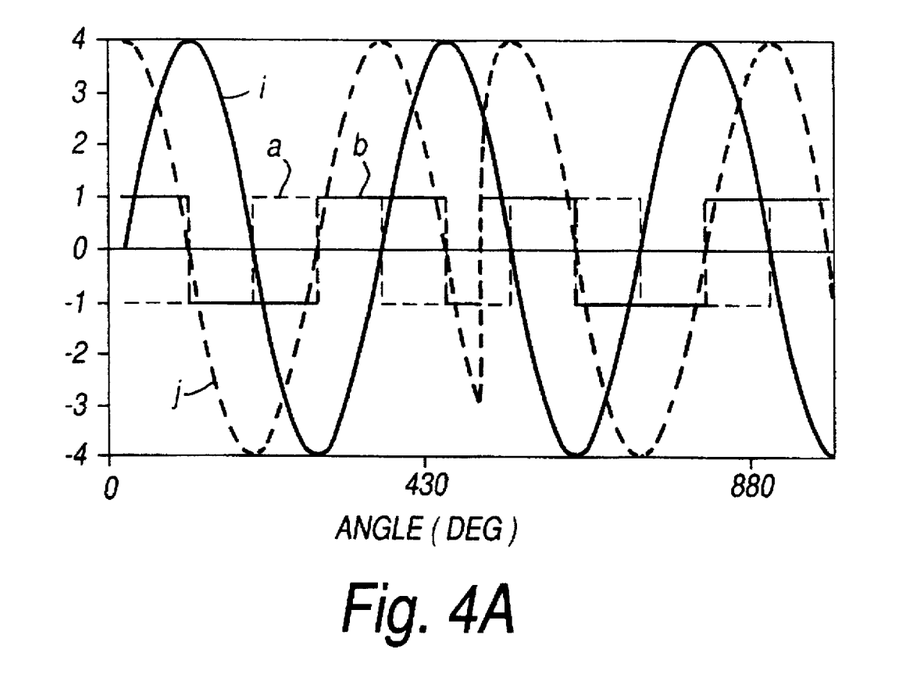
FIGS. 4A–4D are diagrams showing a signal waveforms of each portion of a same embodiment.
Figure 4B:
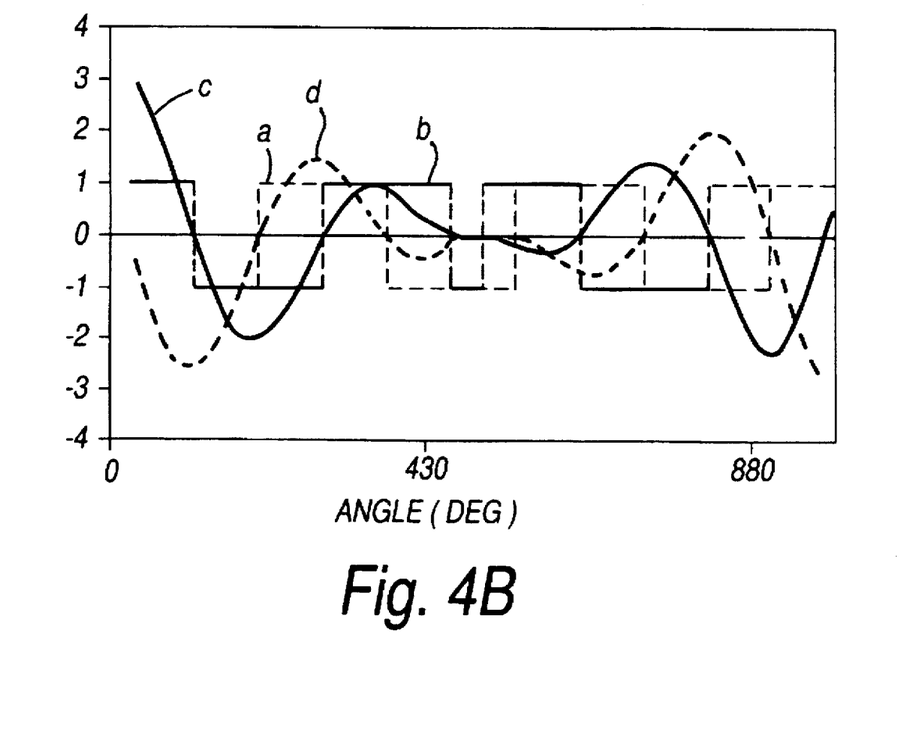

Further, when the optical pickup has changed its direction to move to the opposite direction, i.e., when the optical pickup feed motor 11 in the rotation of one direction is stopped and then started to rotate in opposite direction, the signals on the portions (a), (b), (i) and (j) in FIG. 2 correspond to curves a, b, c and d, as shown in FIG. 4(a).

Figure 4C:
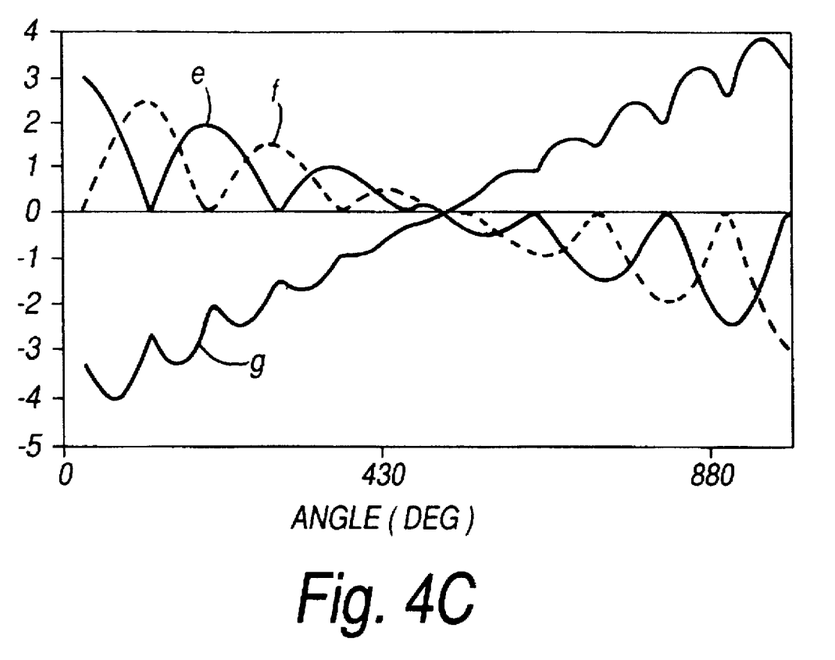

Then the signals on the portiones (e), (f) and (g) in FIG. 2 correspond to curves e, f and g, as shown in FIG. 4(c). That is, it will be found that the signal waveform on the portion (g) in FIG. 2, i.e., the detection signal of the rotation speed of the optical pickup feed motor 11, is almost proportional to both the rotational speed and the rotating direction.

Figure 4D:
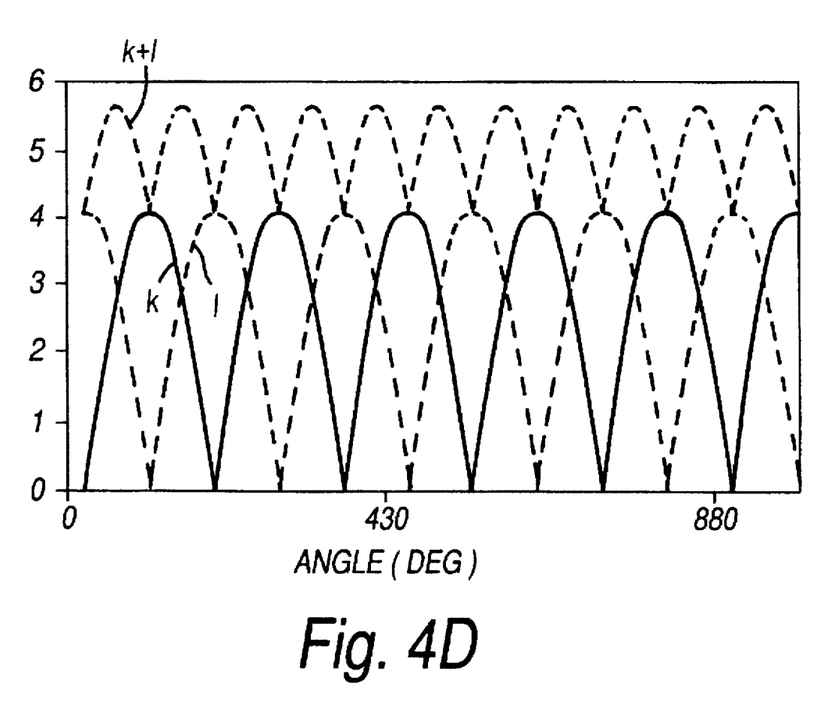

Further, the signal waveforms on the portions (k) and (l) in FIG. 2 correspond to curves k and l, as shown in FIG. 4(d), and thus the direct bias current applied to the Hall effect devices 18 and 24 is controlled so as that the combined signal thereof (it takes a value with k+l in FIG. 4(d)) matches with the DC reference level.

Figure 5:
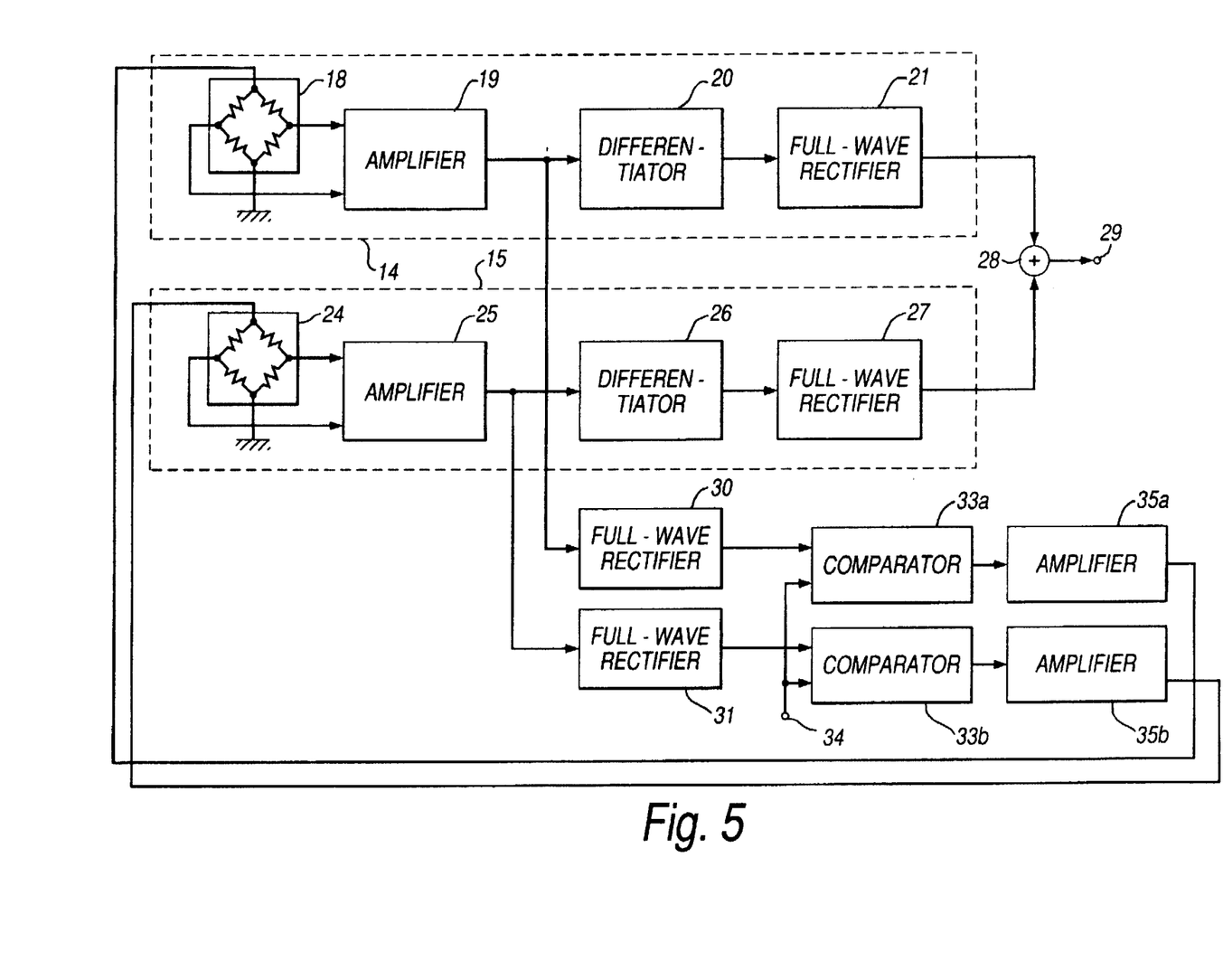
FIG. 5 is a block diagram showing another embodiment of the optical pickup feed motor drive speed detector according to the present invention.

Referring now to FIG. 5, another preferred embodiment of the present invention will be explained hereinafter. In FIG. 5 the same components as those shown in FIG. 1 are assigned with the same numerals. As with the embodiment shown in FIG. 1, the optical pickup feed motor 11, rotor 12 and magnetic rotating member 13, as shown in FIG. 6, are omitted from FIG. 5 for the simplicity of explanations. That is in FIG. 5, AC signals output from amplifiers 19 and 25 of the magnetic-flux density sensing circuits 14 and 15 are supplied to the full-wave rectifiers 30 and 31 for converted the AC signals to DC voltage levels.

The DC voltage levels output from the full-wave rectifiers 30 and 31 are supplied to comparators 33a and 33b to compare their levels with a reference DC level which is applied through an input terminal 34. The comparators 33a and 33b thus output DC voltage levels which correspond to the level difference between the DC voltage levels output from the full-wave rectifiers 30 and 31 and the reference DC level on the input terminal 34. The DC voltage levels are amplified to specific voltage levels in amplifiers 35a and 35b, and then applied to the Hall effect devices 18 and 24 as DC bias voltages, respectively.

In this case, the comparators 33a and 33b control, in a feedback manner, the DC bias voltages applied to the Hall effect devices 18 and 24 to match the DC voltage levels output from the full-wave rectifiers 30 and 31 to the level of the DC reference applied from the input terminal 34. Thus, the detecting sensitivities of the Hall effect devices 18 and 24 are automatically adjusted, respectively through the first feedback loop composed of the amplifier 19, the full-wave rectifier 30, the comparator 33a and the amplifier 35a to the Hall effect device 18, and the second feedback loop composed of the amplifier 25, the full-wave rectifier 31, the comparator 33b and the amplifier 35b to the Hall effect device 24.

Accordingly, the second embodiment of the present invention can also prevent both of the AC signal levels input to the differentiators 20 and 26 from their variations by absorbing variations in the detecting sensitivities of the Hall effect devices 18 and 24, the magnetic-flux densities of the magnetic rotating member 13 or the distances between the Hall effect devices 18, 24 and the magnetic rotating member 13, so as to keep a high degree of reliability in the detecting signal which is obtained from the output terminal 29.

In the above embodiments, the optical pickup feed motor 11 is of the type for rotatably driving the pickup. However the present invention can be adapted to linear motors as to the pickup feed motor, without being limited to the above embodiment.

Further, the present invention can also be adapted for many applications without being limited to the above embodiment and without departing from the principle of the present invention.

As described above, the present invention can provide the extremely advantageous drive speed detector of optical pickup feed motor which is able to keep a high degree of reliability in detecting results without adjusting operations for absorbing variations in physical characteristics of parts.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A drive speed detector of an optical pickup feed motor comprising:

means for detecting a drive speed of an optical pickup feed motor by generating an AC signal having a frequency that is proportional to the drive speed of the optical pickup feed motor; and means for controlling a sensitivity of the detecting means in order to make an amplitude level of the AC signal output from the detecting means uniform, wherein the detecting means includes a first detecting portion for detecting the drive speed of the optical pickup feed motor by generating a first AC signal with a frequency which is proportional to the drive speed of the pickup feed motor and a second detecting portion for detecting the drive speed of the optical pickup feed motor by generating a second AC signal which has a 90 degree of phase difference with the first AC signal output from the first detecting portion, and the controlling means controls the sensitivity of the detecting means in a feedback manner in order to match a level of a third AC signal generated by adding the first AC signal and the second AC signal with a prescribed reference level by comparing these two levels so as that their level difference is eliminated.

2. A drive speed detector of optical pickup feed motor comprising:

means for detecting a drive speed of an optical pickup feed motor by generating an AC signal having a frequency that is proportional to the drive speed of the optical pickup feed motor; and means for controlling a sensitivity of the detecting means in order to make an amplitude level of the AC signal output from the detecting means uniform, wherein the detecting means comprises a magnetic rotating member which is rotatable in conjunction with the pickup feed motor and alternatively magnetized at regular pitches with opposite magnetic poles on its peripheral edge, a first Hall effect device mounted near the magnetic rotating member for generating a first AC signal with a frequency which is proportional to the drive speed of the pickup feed motor based on the magnetic flux density change responding to the rotation of the magnetic rotating member, and a second Hall effect device also mounted near the magnetic rotating member for generating a second AC signal with a frequency which is proportional to the drive speed of the pickup feed motor at a 90 degree phase difference with the first AC signal output from the first Hall effect device based on the magnetic-flux density change responding to the rotation of the magnetic rotating member, and wherein the controlling means comprises first and second rectifiers for respectively carrying out full-wave rectifications for the first and second AC signals output from the first and second Hall effect devices, an adder for adding the first and second AC levels output from the first and second rectifiers with each other, and means for controlling in a feedback manner a DC bias current to be supplied to the first and second Hall effect devices in order to match a level of the DC signal output from the adder with a prescribed reference level by comparing these two levels so as that their level difference is eliminated.

3. A drive speed detector of a data reading unit drive motor comprising:

a first Hall effect device adapted to output a first signal responsive to a rotation of the drive motor;

a second Hall effect device adapted to output a second signal responsive to the rotation of the drive motor;

a feedback control system receiving the outputs of the first and the second Hall effect devices and providing feedback signals to the first and the second Hall effect devices during operation of the drive motor, the feedback signals controlling a sensitivity of the first and the second Hall effect devices.

4. A drive speed detector as claimed in claim 3, wherein the feedback control system comprises:

a first full wave rectifier receiving the first signal from the first Hall effect device;

a second full wave rectifier receiving the second signal from the second Hall effect device;

an adder that adds the outputs of the first and the second full wave rectifiers; and a comparator that compares the output of the adder to a reference value to produce an output representative of a result of a comparison operation conducted by the comparator, wherein the output of the comparator is provided to the first and the second Hall effect devices as the feedback signals for controlling the sensitivity of the first and the second Hall effect devices.

5. A drive speed detector as claimed in claim 3, wherein the feedback control system comprises:

a first full wave rectifier receiving the first signal from the first Hall effect device;

a second full wave rectifier receiving the second signal from the second Hall effect device;

a first comparator that compares the output of the first Hall effect device to a reference value, wherein an output of the first comparator is provided to the first Hall effect device as the feedback signal for controlling the sensitivity of the first Hall effect device; and a second comparator that compares the output of the second Hall effect device to the reference value, wherein an output of the second comparator is provided to the second Hall effect device as the feedback signal for controlling the sensitivity of the second Hall effect device.

* * * * *